US009099726B2

(12) United States Patent
Kim et al.

(10) Patent No.: US 9,099,726 B2
(45) Date of Patent: Aug. 4, 2015

(54) SECONDARY BATTERY AND METHOD OF FABRICATING THE SAME

(75) Inventors: Hyeongsin Kim, Yongin-si (KR); Youngcheol Jang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 417 days.

(21) Appl. No.: 13/006,360

(22) Filed: Jan. 13, 2011

(65) Prior Publication Data

US 2011/0177362 A1 Jul. 21, 2011

Related U.S. Application Data (60) Provisional application No. 61/296,400, filed on Jan. 19, 2010.

(51) Int. Cl.
*H01M 10/04* (2006.01)
*H01M 10/42* (2006.01)
(Continued)

(52) U.S. Cl.
CPC .............. *H01M 2/22* (2013.01); *H01M 2/0469* (2013.01); *H01M 2/0473* (2013.01); *H01M 2/34* (2013.01); *H01M 2/348* (2013.01); *H01M 10/0525* (2013.01); *H01M 10/425* (2013.01);
(Continued)

(58) Field of Classification Search
CPC ... H01M 2/0469; H01M 2/0473; H01M 2/22; H01M 2/34; H01M 2/348; H01M 10/425; H01M 10/0525; H01M 2200/00; H01M 2200/106
USPC .......................................................... 429/7
See application file for complete search history.

(56) References Cited

U.S. PATENT DOCUMENTS

2005/0227150 A1* 10/2005 Xing et al. .................... 429/303
2007/0020509 A1 1/2007 Kim
(Continued)

FOREIGN PATENT DOCUMENTS

CN 101430956 A 5/2009
EP 1804318 A2 7/2007
(Continued)

OTHER PUBLICATIONS

Extended European Search Report issued by the European Patent Office dated Oct. 19, 2012 in Application No. 11151303.2-1227, 6 pages.

(Continued)

*Primary Examiner* — Sean P Cullen
(74) *Attorney, Agent, or Firm* — Knobbe Martens Olson & Bear LLP (57) ABSTRACT

Provided are a secondary battery that reduces space restriction during the formation of a protective circuit module (PCM) and improves reliability of a positive temperature coefficient (PTC) device and a method of fabricating the secondary battery. The secondary battery includes a battery cell including a cell tab and the PCM. The PCM includes a circuit board, a first terminal, a second terminal, and the PTC device. The circuit board includes an upwardly exposed external terminal. The first terminal is disposed below the circuit board and has one end connected to the cell tab and the extending other end. The second terminal is disposed below the circuit board and has one end connected to the external terminal and the extending other end. The PTC device is disposed between the first terminal and the second terminal and below the circuit board.

10 Claims, 9 Drawing Sheets

(51) Int. Cl.
  *H01M 2/22* (2006.01)
  *H01M 2/04* (2006.01)
  *H01M 2/34* (2006.01)
  *H01M 10/0525* (2010.01)

(52) U.S. Cl.
  CPC ..... *H01M2200/00* (2013.01); *H01M 2200/106* (2013.01); *Y02E 60/122* (2013.01); *Y10T 29/49108* (2015.01)

(56) References Cited

U.S. PATENT DOCUMENTS

| | | | |
|---|---|---|---|
| 2008/0107964 A1* | 5/2008 | Choi | 429/174 |
| 2008/0226974 A1* | 9/2008 | Jang et al. | 429/121 |
| 2009/0122455 A1 | 5/2009 | Jang et al. | |
| 2009/0317715 A1 | 12/2009 | Jung et al. | |
| 2012/0160552 A1 | 6/2012 | Jang et al. | |

FOREIGN PATENT DOCUMENTS

| | | |
|---|---|---|
| EP | 2320491 A1 | 5/2011 |
| JP | 2001-071346 | 3/2001 |
| JP | 2001-325943 | 11/2001 |
| JP | 2003-017026 A | 1/2003 |
| JP | 2007-035622 A | 2/2007 |
| JP | 2010-062149 A | 3/2010 |
| KR | 100614401 B1 | 8/2006 |
| KR | 10-2008-0025863 A | 3/2008 |
| KR | 10-2008-0036252 A | 4/2008 |
| KR | 2010-0044487 A | 4/2010 |

OTHER PUBLICATIONS

Office Action dated Feb. 26, 2013 issued by the Japanese Patent Office, 3 pages.

Notice of Allowance dated Apr. 1, 2013, received in connection with Korean Patent Application No. 119980018058, which corresponds to captioned U.S. Appl. No. 13/006,360, in 5 pages.

Chinese Second Office Action dated Jan. 6, 2014, issued in connection with corresponding Chinese Patent Application No. 201110025239.0.

* cited by examiner

SECONDARY BATTERY AND METHOD OF FABRICATING THE SAME

BACKGROUND OF THE INVENTION

1. Field of the Invention

Embodiments relate to a secondary battery and a method of fabricating the same.

2. Description of the Related Art

Generally, rechargeable battery packs include a rechargeable battery cell and a protective circuit module (PCM) for preventing the battery cell from being overcharged or overdischarged. Lithium ion batteries or lithium polymer batteries can be used as the battery cell. The PCM includes a plurality of circuit devices for preventing the battery cell from being overcharged or overdischarged.

The lithium polymer batteries can be complete solid type lithium ion polymer batteries containing no organic electrolyte or lithium ion polymer batteries using a gel type polymer electrolyte containing an organic electrolyte.

In case of the lithium ion polymer batteries, leaking of the electrolyte is reduced or does not occur when compared to lithium ion batteries using liquid electrolyte. Thus, the lithium ion polymer batteries may use a pouch instead of a metal can as a case. The pouch is formed of a metal foil and an insulating layer.

SUMMARY OF THE INVENTION

Embodiments are directed to a secondary battery that reduces space restriction during the formation of a protective circuit module (PCM) and improves reliability of a positive temperature coefficient (PTC) device and a method of fabricating the same.

At least one of the above and other features and advantages may be realized by providing a secondary battery including: a battery cell including a cell tab; and a protective circuit module (PCM) including: a circuit board including an upwardly exposed external terminal; a first terminal disposed below the circuit board, the first terminal having one end connected to the cell tab and the extending other end; a second terminal disposed below the circuit board, the second terminal having one end connected to the circuit board and the extending other end; and a positive temperature coefficient (PTC) device disposed between the first terminal and the second terminal, the PTC device being disposed below the circuit board.

At least one insulating tape may be further disposed between the circuit board and the PTC device.

At least one of the above and other features and advantages may be realized by providing a method of fabricating a secondary battery, the method including: coupling a PTC device to ends of a first terminal and a second terminal disposed on a circuit board of a PCM; coupling a cell tab of a battery cell to the other ends of the first terminal and the second terminal; bending the first terminal and the second terminal to position the PTC device below the circuit board; and bending the cell tab so that a top surface of the PCM is parallel to that of the battery cell.

Before the bending of the first terminal and the second terminal, the method of fabricating the secondary battery may further include attaching an insulating tape to cover the ends of the first terminal and the second terminal.

In the secondary battery according to an embodiment, the first terminal connected to the cell tab of the battery cell and the second terminal connected to the first terminal laterally protrude and extend from the circuit board. Also, the PTC device is disposed between the first terminal and the second terminal. The first terminal and the second terminal are bent to position the PTC device below the circuit board. Therefore, the positional restriction of the PTC device may be reduced, and a space within the PCM may be secured.

In addition, since the top surface of the PTC device may be adjacent to that of battery cell to secure the reliability of the PTC device.

DETAILED DESCRIPTION OF THE INVENTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the present embodiments to those skilled in the art.

Hereinafter, a configuration of a secondary battery according to an embodiment will be described.

Figure 1:
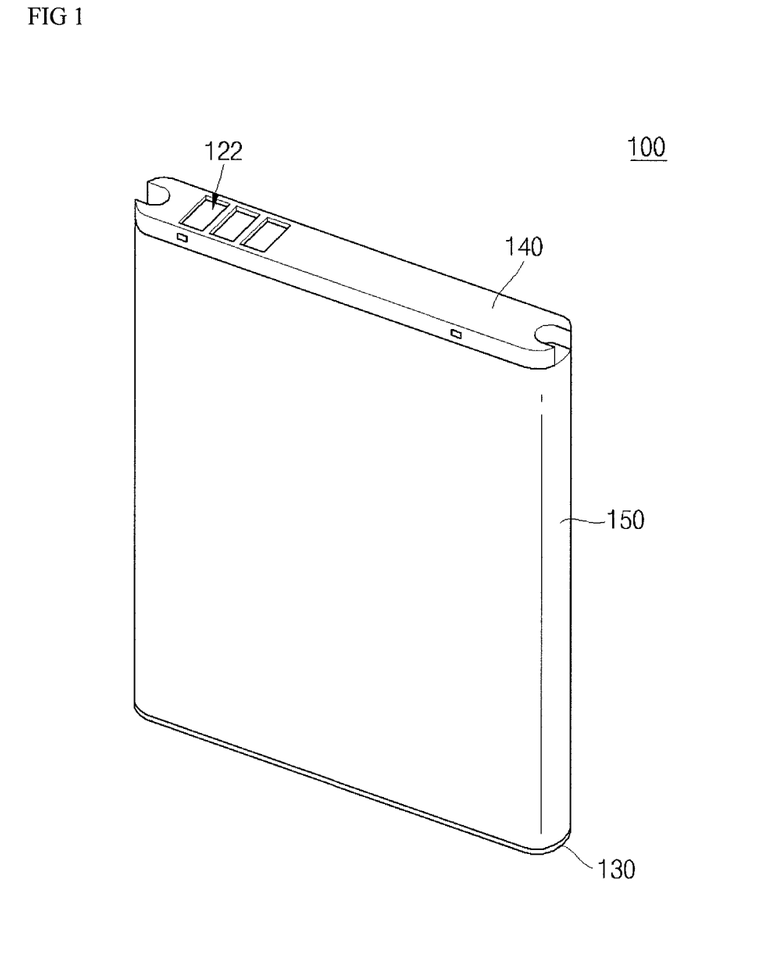
FIG. 1 illustrates a perspective view of a secondary battery according to an embodiment.
Figure 2:
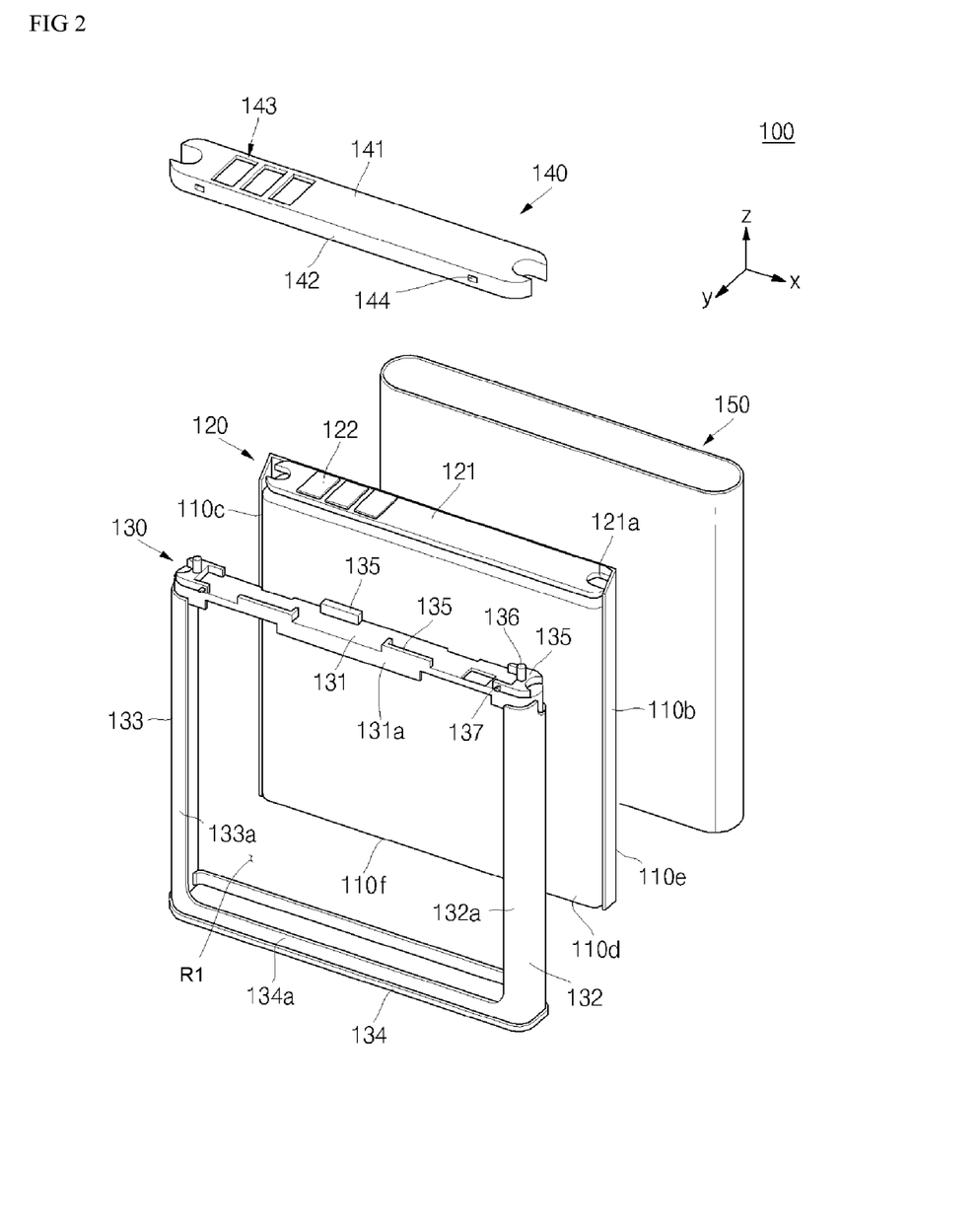
FIG. 2 illustrates an exploded perspective view of the secondary battery according to an embodiment.
Figure 3:
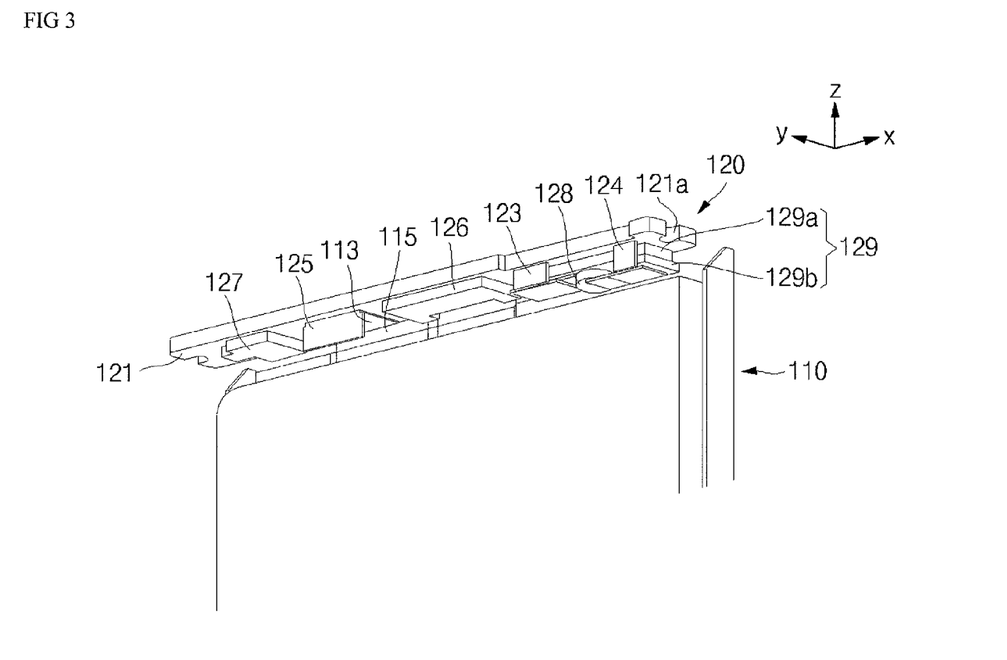
FIG. 3 illustrates an enlarged perspective view of a state in which a battery cell is coupled to a protective circuit module in FIG. 2.
Figure 4:
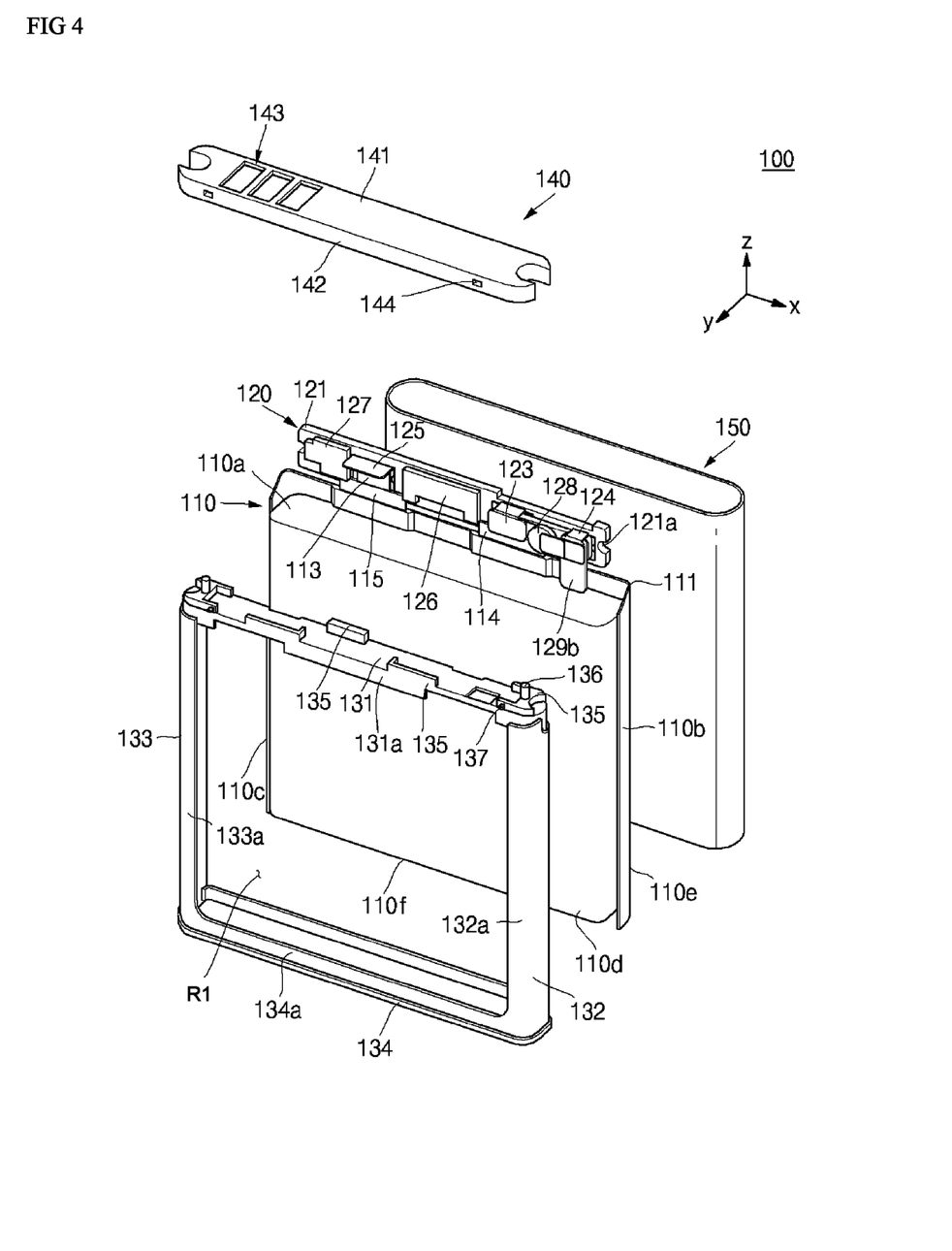
FIG. 4 illustrates a view of a state in which the protective circuit module of FIG. 2 is bent upwardly.
Figure 5:
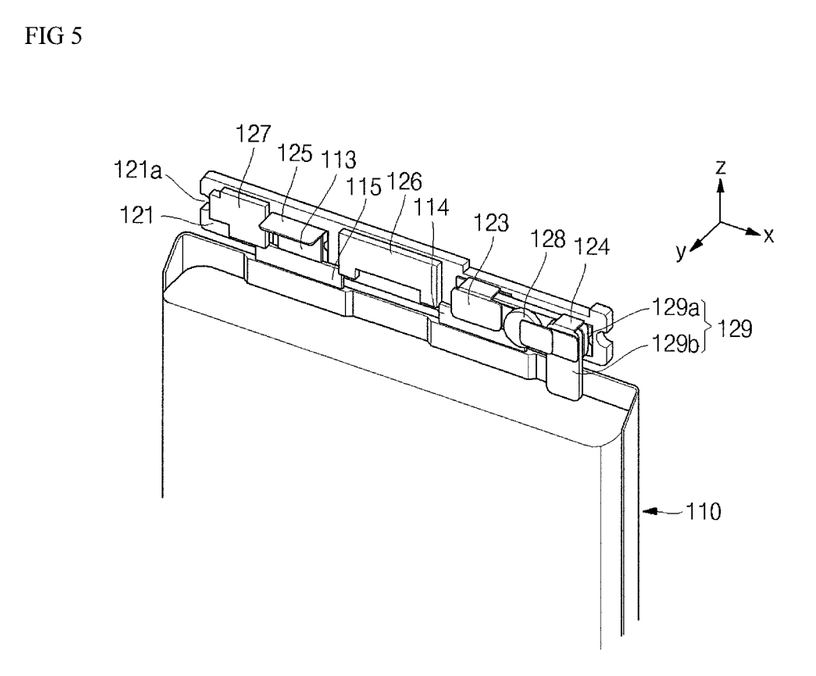
FIG. 5 illustrates a perspective view of a state in which the battery cell is coupled to the protective circuit module in FIG. 4.
Figure 6:
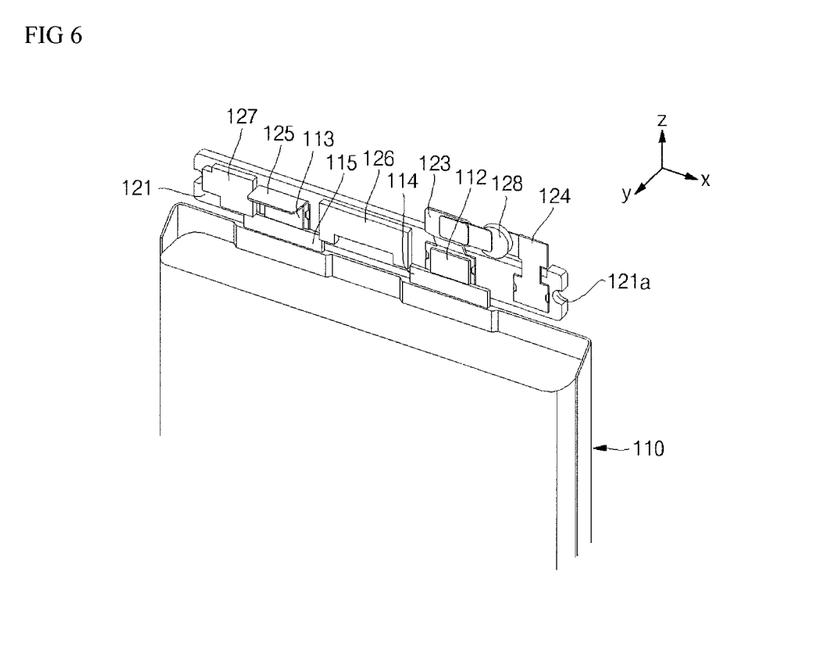
FIG. 6 illustrates a view of a state in which a positive temperature coefficient device of FIG. 5 is bent upwardly to remove an insulating tape.

FIG. 1A illustrates a perspective view of a secondary battery according to an embodiment. FIG. 2A illustrates an exploded perspective view of the secondary battery according to an embodiment. FIG. 3 illustrates an enlarged perspective view of a state in which a battery cell is coupled to a protective circuit module in FIG. 2. FIG. 4 illustrates a view of a state in which the protective circuit module of FIG. 2 is bent upwardly. FIG. 5 illustrates a perspective view of a state in which the battery cell is coupled to the protective circuit module in FIG. 4. FIG. 6 illustrates a view of a state in which a positive temperature coefficient device of FIG. 5 is bent upwardly to remove an insulating tape.

Referring to FIGS. 1 to 6, a secondary battery 100 according to an embodiment includes a battery cell 110, a protective circuit module (PCM) 120, a frame case 130, a top cover 140, and a label 150.

The battery cell 110 stores or discharges an electric charge. The battery cell 110 may be, for example, a "can type" or a "pouch type" according to a material surrounding an electrode assembly (not shown). In the secondary battery 110 according to an embodiment, the pouch type battery cell 110 will be described as an example.

The battery cell 110 includes the electrode assembly (not shown), a pouch case 111, and first and second cell tabs 112 and 113. The electrode assembly includes a positive electrode, a negative electrode, and a separator disposed between the positive electrode and the negative electrode. The pouch case 111 receives the electrode assembly. The first and second cell tabs 112 and 113 are connected to the positive electrode and the negative electrode of the electrode assembly, respectively. The first and second cell tabs 112 and 113 are exposed to a surface of the pouch case 111. Insulating tapes 114 and 115 for preventing the cell tabs 112 and 113 and the pouch case 111 from being electrically short-circuited together may be further disposed on positions at which the cell tabs 112 and 113 contact the pouch case 111.

The battery cell 110 has a top surface 110a, a pair of short side surfaces 110b and 110c, a pair of long side surfaces 110d and 110e, and a bottom surface 110f. The PCM 120 is disposed on the top surface 110a of the battery cell 110. The pair of short side surfaces 110b and 110c and the pair of long side surfaces 110d and 110e are connected to the top surface 110a. The bottom surface 110f faces the top surface 110a and is connected to the side surfaces 110b, 110c, 110d, and 110e. Here, the pair of short side surfaces 110b and 110c represents side surfaces having a relatively narrow width among the side surfaces 110b, 110c, 110d, and 110e connected to the top surface 110a of the battery cell 110. The pair of long side surfaces 110d and 110e represents side surfaces having a relatively wide width among the side surfaces 110b, 110c, 110d, and 110e connected to the top surface 110a of the battery cell 110.

The PCM 120 is disposed on the top surface 110a of the battery cell 110. The PCM 120 is electrically connected to the battery cell 110 to control a charge/discharge state of the battery cell 110. The PCM 120 includes a circuit board 121, an external terminal 122, internal terminals 123 to 125, a positive temperature coefficient (PTC) device, and an insulating tape 129. In addition, the PCM 120 may further include a charge/discharge switching device 126 and a control device 127.

The circuit board 121 includes an insulating layer having, for example, a plate shape. The external terminal 122 is electrically connected to the internal terminals 123 to 125 through an interconnection pattern (not shown) disposed inside the circuit board 121. Here, the external terminal 122 is disposed on a top surface of the circuit board 121 to electrically connect the circuit board 121 to the external terminal (not shown). Also, the circuit board 121 may have coupling holes 121a in both sides of a longitudinal direction to couple the frame case 130 thereto.

FIG. 4 illustrates a view of a state in which the PCM 120 is bent in a vertical direction (a z-axis direction of FIG. 4) to illustrate a bottom surface of the PCM 120. FIG. 5 illustrates a perspective view of a state in which the battery cell 110 is coupled to the PCM 120 in FIG. 4. FIG. 6 illustrates a view of a state in which the PTC device 128 of FIG. 5 is bent in a vertical direction (a z-axis direction of FIG. 6) to remove an insulating tape 129.

Referring to FIGS. 4 to 6, the internal terminals 123 to 125 are exposed toward a lower side of the circuit board 121. The internal terminals 123 to 125 may be formed, for example, of nickel. The internal terminals 123 to 125 include a first terminal 123, a second terminal 124, and a third terminal 125. The first terminal 123 is connected to the first cell tab 112 of the battery cell 110 from a lower portion of the circuit board 121. The second terminal 124 is connected to the first terminal 123 through the PTC device 128. The third terminal 125 is connected to the second cell tab 113.

The first terminal 123 and the second terminal 124 have one end disposed on a bottom surface of the circuit board 121 and the other end extending toward a side (a z-axis direction of FIG. 3) of the circuit board 121. The first terminal 123 has one end coupled to the first cell tab 112, and the first terminal 123 and the second terminal 124 have the other ends coupled to the PTC device 128.

The other ends of the first terminal 123 and the second terminal 124 are bent toward the bottom surface (a y-axis direction of FIG. 4) of the circuit board 121 in a state where the other ends of the first terminal 123 and the second terminal 124 are connected to the PTC device 128. The first terminal 123 and the second terminal 124 having one end coupled to the bottom surface of the circuit board 121 are coupled to the PTC device 128 through the other end protruding toward a side (the z-axis direction of FIG. 4) of the circuit board 121, and the other end of the first terminal 123 and the second terminal 124 are bent at about 180° and disposed at a lower side (a y-axis direction of FIG. 3) of the circuit board 121 to face the bottom surface of the circuit board 121. Thus, a portion at which the first terminal 123 is connected to the PTC device 128 is bent, and thus is disposed below a portion at which the first terminal 123 is connected to the first cell tab 112. As a result, positional restriction of the PTC device 128 within the PCM 120 and space restriction against the PCM 120 may be reduced. In addition, a voltage of the first cell tab 112 applied to the first terminal 123 is transmitted to the second terminal through the PTC device 128 and transmitted to the external terminal 122 through an interconnection of the circuit board 121.

The third terminal 125 surrounds the second cell tab 113 in front and rear directions. The third terminal 125 may be coupled to the second cell tab 113 using welding.

The charge/discharge switching device 126 and the control device 127 are disposed on the bottom surface (the y-axis direction of FIG. 3) of the circuit board 121. The control device 127 may include an integrated IC. The control device 127 detects a charge voltage, a discharge voltage, and current of the battery cell 110. Also, the charge/discharge switching device 126 intercepts current applied to the battery cell 110 when an overcharge, overdischarge, or overcurrent of the battery cell 110 is detected.

The PTC device 128 is disposed below (the y-axis direction of FIG. 3) the circuit board 121. The PTC device 128 is coupled between the first terminal 123 and the second terminal 124. The PTC device 128 intercepts current when a temperature of the battery cell 110 is higher than an allowable temperature to prevent the battery cell 110 from being degraded by excess heat. The PTC device 128 may include a chip PTC thermistor, but is not limited thereto. Since the first terminal 123 and the second terminal 124 are bent in a state where the first terminal 123 and the second terminal 124 are coupled to the PTC device 128, the PTC device 128 faces a top surface of the battery cell 110. Also, since the PTC device 128 is disposed adjacent to the top surface of the battery cell 110, heat may be easily transmitted to the PTC device 128 through the battery cell 110. Thus, reliability of the PTC device 128 may be secured due to the bending of the first terminal 123 and the second terminal 124.

The insulating tape 129 is disposed between the bent first and second terminals 123 and 124. The insulating tape 129 includes a first insulating tape 129a and a second insulating tape 129b. The first insulating tape 129a extends from the first terminal 123 to the second terminal 124 and is disposed in a transverse direction (an x-axis direction of FIG. 4). The second insulating tape 129b is disposed along a length direction (a -z-axis direction of FIG. 4) of the second terminal 124. Here, the second insulating tape 129b has a thickness corresponding to that of the PTC device 128 to support a height difference between the first terminal 123 and the second terminal 124 that are coupled to both ends of the PTC device 128. The first insulating tape 129a and the second insulating tape 129b are disposed inside the bent first and second terminals 123 and 124 when the first and second terminals 123 and 124 are bent to support the bent configurations of the first and second terminals 123 and 124. Also, the first insulating tape 129a and the second insulating tape 129b electrically insulate a bottom surface of the PTC device 128 from the circuit board 121.

The frame case 130 is disposed between the battery cell 110 and the PCM 120. The frame case 130 covers the top surface 110a, the bottom surface 110f, and the pair of short side surfaces 110b and 110c of the battery cell 110. Also, the frame case 130 covers lateral edges of the pair of long side surfaces 110d and 110e of the battery cell 110. As a result, the frame case 130 has a receiving space R1 of the battery cell 110.

The frame case 130 may include planar parts 131, 132, 133, and 134 and extension parts 131a, 132a, 133a, and 134a. The planar parts 131, 132, 133, and 134 cover the top surface 110a, the pair of short side surfaces 110b and 110c, and the bottom surface 110f of the battery cell 110, respectively. The extension parts 131a, 132a, 133a, and 134a are bent from the planar parts 131, 132, 133, and 134 and extend toward the battery cell 110 to cover edges of the battery cell 110.

The frame case 130 may include a support 135, a coupling protrusion 136, and a rib 137. The support 135 vertically protrudes from the planar part 131. The coupling protrusion 136 vertically protrudes from the support 135. The rib 137 laterally protrudes from the support 135. The support 135 protrudes from the planar part 131 to support the PCM 120 to be coupled to an upper portion thereof. The coupling protrusion 136 protrudes from the support 135 and is coupled to a coupling hole 121a of the circuit board 121. Also, the rib 137 is coupled to a rib coupling hole 144 of a top cover 140 coupled to an upper portion of the PCM 120.

The top cover 140 is coupled to an upper portion of the battery cell 110 to receive the PCM 120 therein. The top cover includes a cover plate 141 and a sidewall 142.

The cover plate 141 may have a shape approximately similar to that of the circuit board 121. A through hole 143 is defined in a region corresponding to the external terminal 122 of the PCM 120. The through hole 143 may expose the external terminal 122 to electrically connect the secondary battery 100 to an external device (not shown).

The sidewall 142 extends from the cover plate 141 toward the PCM 120 to receive the PCM 120. Also, the sidewall 142 has the rib coupling hole 144 in a region corresponding to the rib 137 of the frame case 130. When the rib 137 and the rib coupling hole 144 are coupled to couple the frame case 130 to the top cover 140.

The label 150 is attached to the side surfaces 110b, 110c, 110d, and 110e of the battery cell 110 and can be attached in a way that surrounds the battery cell. The label 150 covers a lower portion of the top cover 140. The label 150 may improve coupling forces between the battery cell 110, the frame case 130, and the top cover 140.

As described above, in the secondary battery 100 according to an embodiment, the first terminal 123 connected to the first cell tab 112 of the battery cell 110 and the second terminal 124 connected to the first terminal 123 laterally protrude and extend from the circuit board 121. Also, the PTC device 128 is disposed between the first terminal 123 and the second terminal 124. The first terminal 123 and the second terminal 124 are bent to allow the PTC device 128 to be disposed above a position at which the first cell tab 112 is coupled to the first terminal 123. Therefore, the positional restriction of the PTC device 128 may be reduced within the PCM 120. In addition, a top surface of the YTC device 128 may be adjacent to the top surface of the battery cell 110 to secure the reliability of the PTC device 128.

Hereinafter, a method of fabricating a secondary battery according to an embodiment will be described.

Figure 7:
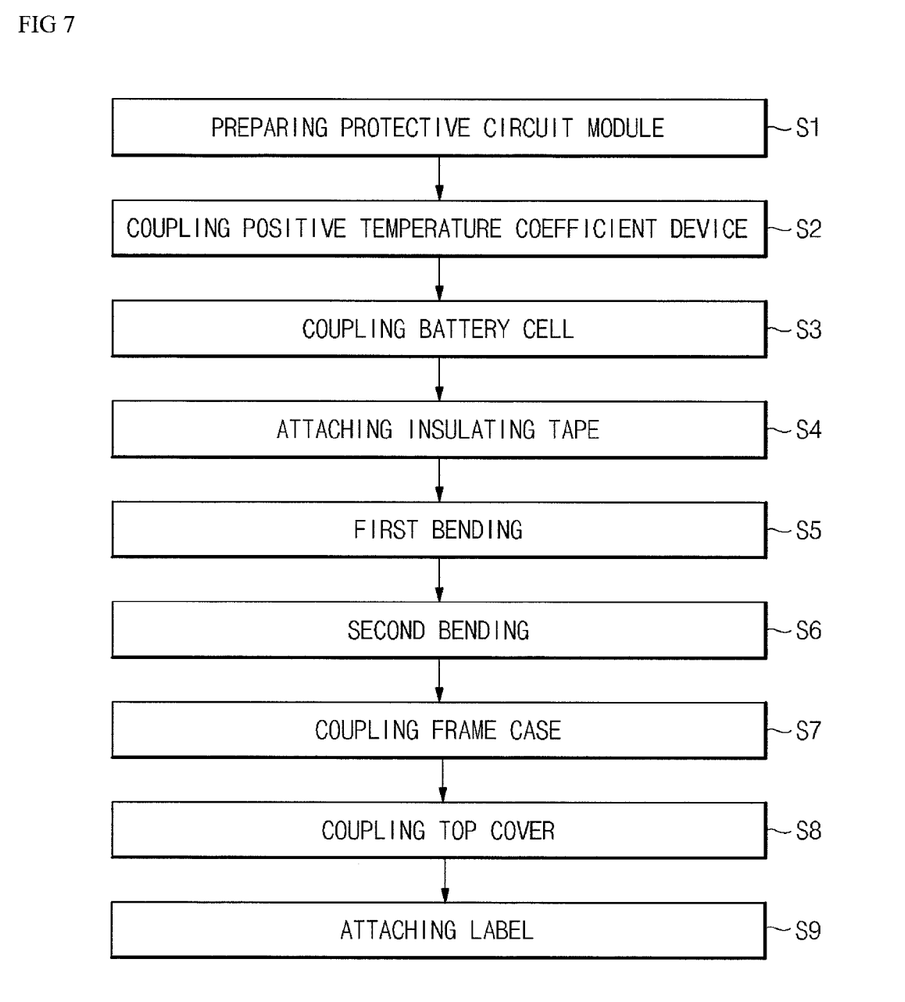
FIG. 7 illustrates a flowchart for explaining a method of fabricating a secondary battery according to an embodiment.

FIG. 7 illustrates a flowchart for explaining a method of fabricating a secondary battery according to an embodiment.
FIGS. 8A to 8F illustrate views for explaining a method of fabricating a secondary battery according to an embodiment.

Referring to FIG. 7, a method of fabricating a secondary battery according to an embodiment includes a protective circuit module (PCM) preparation process S1, a positive temperature coefficient (PTC) device coupling process S2, a battery cell coupling process S3, an insulating tape attachment process S4, a first bending process S5, and a second bending process S6. After the second bending process S6 is performed, a frame case coupling process S7, a top cover coupling process S8, and a label attachment process S9 may be performed. Hereinafter, the processes of FIG. 7 will be described with reference to FIGS. 8A to 8F.

Figure 8A:
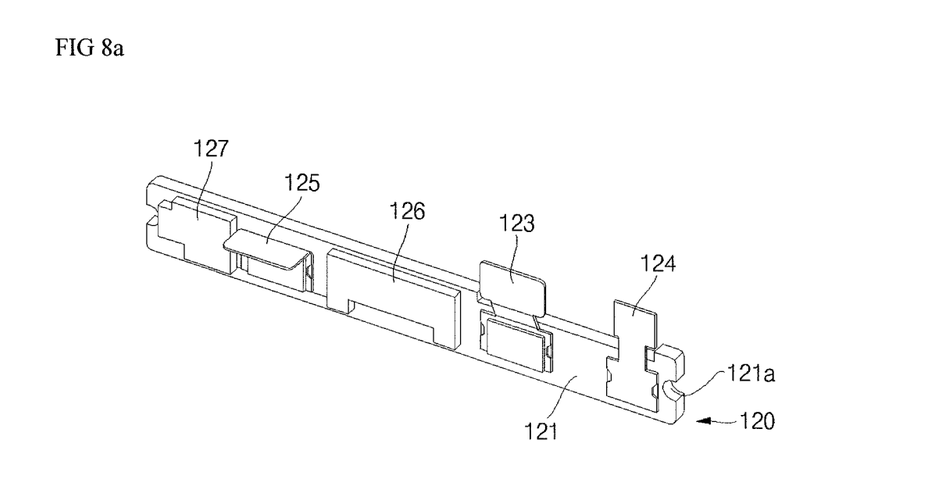
FIGS. 8A to 8F illustrate views for explaining a method of fabricating a secondary battery according to an embodiment.

Referring to FIGS. 7 and 8A, the PCM preparation process S1 represents a process in which a PCM including a first terminal 123, a second terminal 124, a third terminal 125, a charge/discharge switching device 126, and a control device 127 on a bottom surface of a circuit board 121 is prepared. Here, the first terminal 123 and the second terminal 124 have one ends disposed below the circuit board 121 and the other ends laterally extending and protruding from the circuit board 121. Also, the first terminal 123 and the second terminal 124 may have a height difference corresponding to a thickness of a PTC device 128 to be coupled later.

Figure 8B:
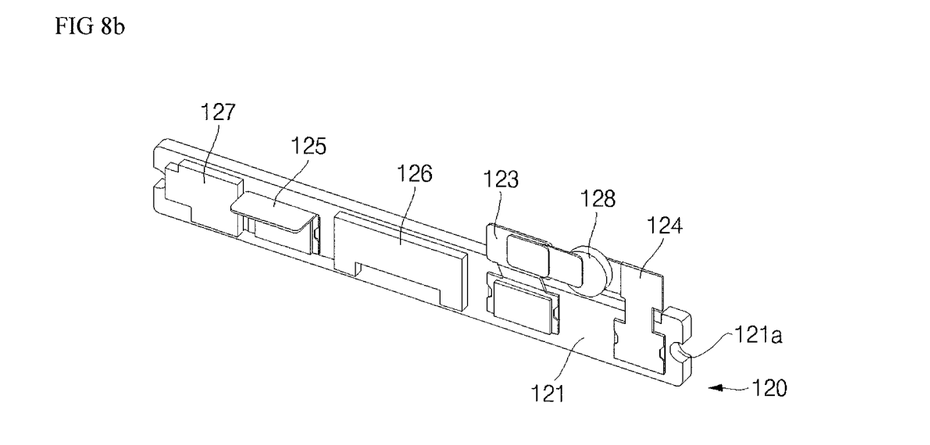

Referring to FIGS. 7 and 8B, the PTC device coupling process S2 represents a process in which the PTC device 128 is coupled to the first terminal 123 and the second terminal 124. The PTC device has one end coupled to the first terminal 123 and the other end coupled to the second terminal 124. Also, the coupling process may be performed using a typical welding method. The first terminal 123 may be electrically connected to the second terminal 124 through the PTC device 128.

Figure 8C:
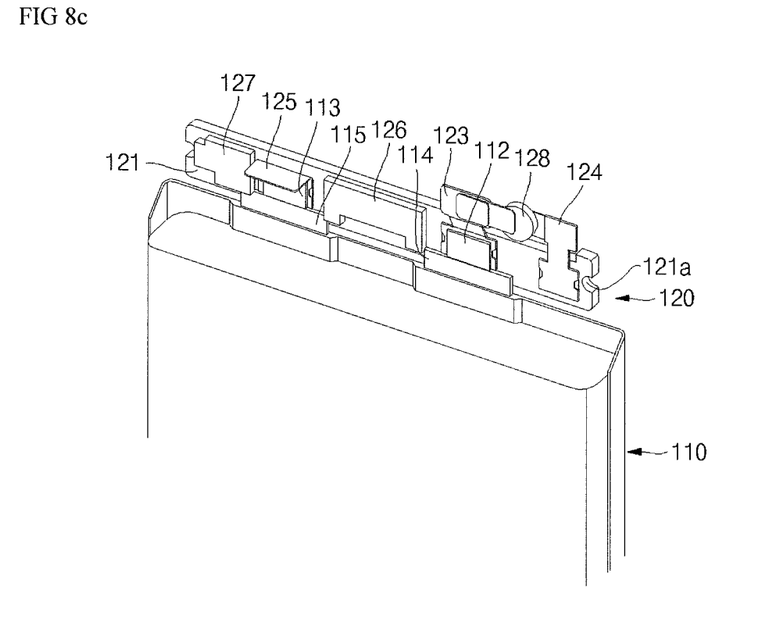

Referring to FIGS. 7 and 8C, the battery cell coupling process S3 represents a process in which a first cell tab 112 and a second cell tab 113 of a battery cell 110 are coupled to the first terminal 123 and the second terminal 124 of the PCM 120, respectively. The coupling process may be performed using a typical welding method. Here, a welding process may be performed in a state where the first terminal 123 is coupled to the first cell tab 112 to couple the first terminal 123 to the first cell tab 112. Also, a welding process may be performed in a state where the third terminal 125 surrounds the second cell tab 113 to couple the third terminal to the second cell tab 113.

Figure 8D:
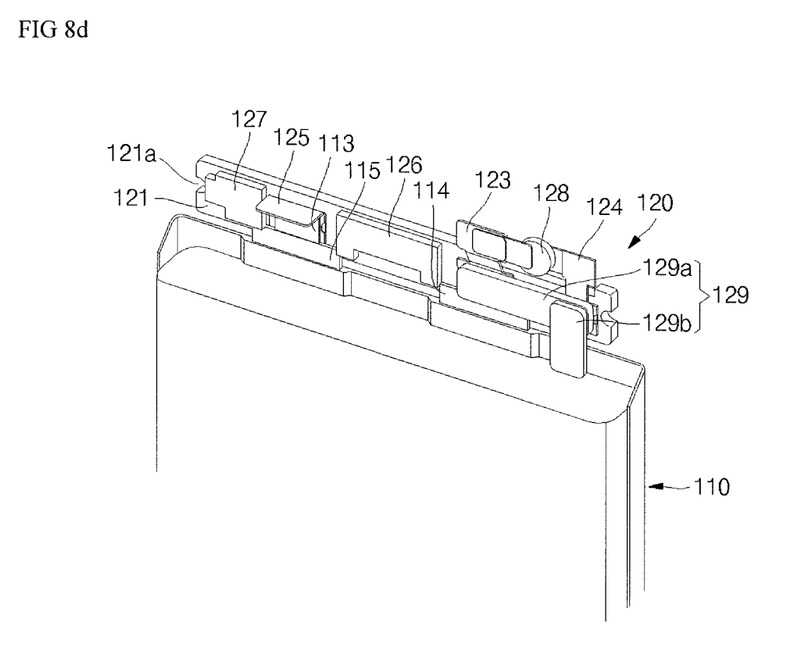

Referring to FIGS. 7 and 8D, the insulating tape attachment process S4 represents a process in which an insulating tape 129 is attached to the first terminal 123 and the second terminal 124. The insulating tape 129 includes a first insulating tape 129a connected from the first terminal 123 to the second terminal 124 and a second insulating tape 129b formed along a length direction of the second terminal 124. In the insulating tape attachment process S4, the first insulating tape 129a covers a portion at which the first cell tab 112 is welded to the first terminal 123 and extends up to the second terminal 124, thereby being attached thereto. The second insulating tape 129b is vertically attached to the first insulating tape 129a along the length direction of the second terminal 124. Here, the second insulating tape 129b has a thickness corresponding to that of the PTC device 128.

Figure 8E:
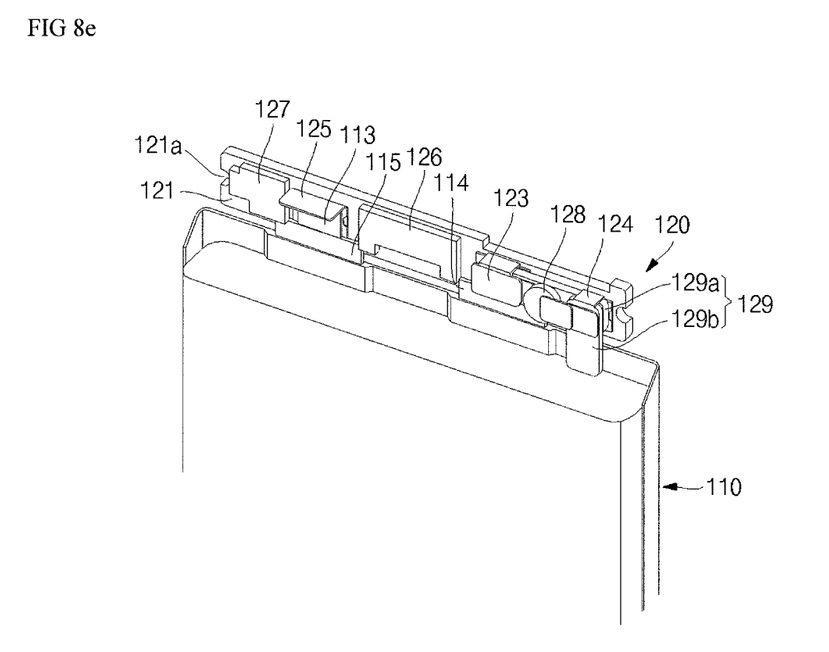

Referring to FIGS. 7 and 8E, the first bending process S5 represents a process in which the first terminal 123 and the second terminal 124 are bent. The first terminal 123 and the second terminal 124 are bent to allow a bottom surface of the PTC device 128 to face a bottom surface of the circuit board 121. The first terminal 123 and the second terminal 124 are bent at about 180°. As a result, the bottom surface of the PTC device 128 contacts the insulating tape 129 and faces the bottom surface of the circuit board 121.

Figure 8F:
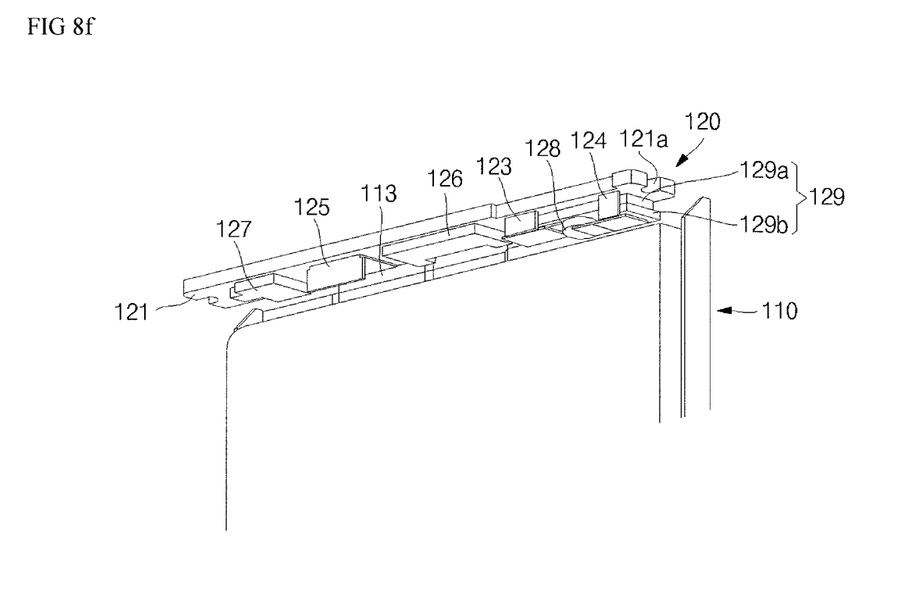

Referring to FIGS. 7 and 8F, the second bending process S6 represents a process in which the cell tabs 112 and 113 are bent. The cell tabs 112 and 113 are bent so that a top surface of the PCM 120 is parallel to that of the battery cell 110. The cell tabs 112 and 113 are bent at about 90°. A welded region between the first cell tab 112 and the first terminal 123 vertically overlaps a welded region between the first terminal 123 and the PTC device 128. Thus, as described above, restriction of a space required for the attachment of the PTC device 128 within the PCM 120 may be reduced.

Also, since the cell tabs 112 and 113 are bent, a top surface of the PTC device 128 connected to the first terminal 123 and the second terminal 124 is adjacent to that of the battery cell 110. Thus, as described above, operating reliability of the PTC device 128 may be improved.

Referring to FIG. 7, the frame case coupling process S7 represents a process in which the frame case 130 is coupled between the battery cell 110 and the PCM 120. The frame case 130 is coupled from a front surface of the battery cell 110. As a result, the battery cell 110 is inserted and seated inside the frame case 130. A support 135 supports the circuit board 121 of the PCM 120, and a protrusion 136 is coupled to a coupling hole 121a of the circuit board 121 to fix the frame case 130.

Referring again to FIG. 7, the top cover coupling process S8 represents a process in which a top cover 140 is coupled to an upper portion of the frame case 130. A rib 137 of the frame case 130 may be coupled to a rib coupling hole 144 to fix the top cover 140. An external terminal 122 of the PCM 120 may be exposed through a through hole 143 of the top cover 140.

Referring again to FIG. 7, the label attachment process S9 represents a process in which a label 150 is attached to an outer surface of the frame case 130. The label 150 is attached to the outside of the frame case 130 to surround side surfaces of the battery cell 110 and a lower portion of the top cover 140. As a result, the battery cell 110, the PCM 120, the frame case 130, and the top cover 140 may be firmly coupled.

The secondary battery 100 according to an embodiment may be manufactured through the above-described processes. In the secondary battery 100 according to an embodiment, since the two bending processes S5 and S6 are performed to position the PTC device 128 at a position at which the first cell tab 112 is coupled to the first terminal 123 within the PCM 120, the positional restriction of the PTC device 128 may be reduced. In addition, since the top surface of the PTC device 128 may be adjacent to that of battery cell 110 to secure the reliability of the PTC device 128.

Exemplary embodiments have been disclosed herein, and although specific terms are employed, they are used and are to be interpreted in a generic and descriptive sense only and not for purpose of limitation. For example, the processing of embodiments may be implemented firmware or in software, e.g., by an article of manufacture having a machine-accessible medium including data that, when accessed by a machine, cause the machine to drive a battery management system. Accordingly, it will be understood by those of ordinary skill in the art that various changes in form and details may be made without departing from the spirit and scope of the present embodiments as set forth in the following claims.

What is claimed is:

1. A secondary battery comprising:
    a battery cell comprising at least a first cell tab; and
    a protective circuit module (PCM) comprising:
        a circuit board comprising an upwardly exposed external terminal;
        a first terminal disposed below the circuit board and contacting the circuit board, wherein the first terminal has one end directly connected to the first cell tab;
        a second terminal disposed below the circuit board and contacting the circuit board,
    wherein the second terminal has one end connected to the circuit board; and
        a positive temperature coefficient (PTC) device disposed between the first terminal and the second terminal,
    wherein the PTC device is disposed below the circuit board and adjacent to a top surface of the battery cell.

2. The secondary battery of claim 1, wherein the second terminal is connected to the external terminal via the circuit board.

3. The secondary battery of claim 1, wherein the positive temperature coefficient device comprises a PTC thermistor.

4. The secondary battery of claim 1, wherein the secondary battery is a lithium ion battery.

5. The secondary battery of claim 4, wherein the lithium ion battery is a lithium ion polymer battery.

6. The secondary battery of claim 1, further comprising an insulating tape wherein the insulating tape comprises a first insulating tape and a second insulating tape.

7. The secondary battery of claim 6, wherein the second insulating tape covers the PTC device.

8. The secondary battery of claim 6, wherein a thickness of the second insulating tape corresponds to a thickness of the PTC device.

9. The secondary battery of claim 1, further comprising a third terminal and a second cell tab.

10. The secondary battery of claim 9, wherein the third terminal is connected to the second cell tab.

* * * * *